(12) United States Patent
Moreno Patan et al.

(10) Patent No.: US 11,828,372 B2
(45) Date of Patent: Nov. 28, 2023

(54) CHECK VALVE ASSEMBLY

(71) Applicant: General Electric Company, Schenectady, NY (US)

(72) Inventors: Victor Moreno Patan, Querétaro (MX); Maria Guadalupe Martinez Escobedo, El Marqués (MX); Diana Julieta Méndez Maya, Querétaro (MX); Liliana Jaramillo Ochoa, El Marqués (MX); Luis Daniel Muñoz Sosa, Querétaro (MX); Jose Ramon Garcia Martinez, Querétaro (MX)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/657,511

(22) Filed: Mar. 31, 2022

(65) Prior Publication Data
US 2023/0313896 A1 Oct. 5, 2023

(51) Int. Cl.
*F16K 15/03* (2006.01)
*F16K 27/02* (2006.01)

(52) U.S. Cl.
CPC ........ *F16K 15/038* (2013.01); *F16K 27/0227* (2013.01)

(58) Field of Classification Search
CPC ............ F16K 15/038; F16K 27/0227; F16K 11/052–0525; F16K 15/036; F16K 1/222; Y10T 137/7839; A61F 2/2403
See application file for complete search history.

(56) References Cited

U.S. PATENT DOCUMENTS

| | | | | |
|---|---|---|---|---|
| 4,692,165 A | * | 9/1987 | Bokros | A61F 2/2403 623/2.22 |
| 4,822,353 A | * | 4/1989 | Bokros | A61F 2/2403 623/2.22 |
| 4,846,830 A | * | 7/1989 | Knoch | A61F 2/2409 623/2.22 |
| 4,863,459 A | * | 9/1989 | Olin | A61F 2/2409 623/2.22 |

(Continued)

FOREIGN PATENT DOCUMENTS

| | | | |
|---|---|---|---|
| EP | 0211576 A2 | * | 2/1987 |
| EP | 0403649 B1 | * | 2/1995 |
| GB | 1457311 A | | 12/1976 |

*Primary Examiner* — Marina A Tietjen
(74) *Attorney, Agent, or Firm* — Venable LLP; Elizabeth C. G. Gitlin; Michele V. Frank

(57) ABSTRACT

A check valve assembly includes a first flapper, a second flapper, an internal passage formed by the first flapper and the second flapper, and a nozzle disposed within the internal passage and configured to generate an internal flow in the internal passage. In response to a fluid flow through the check valve assembly, the first flapper and the second flapper are configured to move between an open position allowing the internal flow through the internal passage and an outer flow outside the internal passage, and a closed position preventing flow through the internal passage. When the first flapper and the second flapper are operably in the open position, the internal flow has a lower pressure than the outer flow outside of the internal passage, such that the first flapper and the second flapper are maintained in the open position.

20 Claims, 13 Drawing Sheets

(56) References Cited

U.S. PATENT DOCUMENTS

| | | | | |
|---|---|---|---|---|
| 4,950,287 | A * | 8/1990 | Reif | A61F 2/2403 |
| | | | | 623/2.33 |
| 4,995,881 | A * | 2/1991 | Knoch | A61F 2/2403 |
| | | | | 623/2.29 |
| 5,026,391 | A * | 6/1991 | McQueen | A61F 2/2403 |
| | | | | 623/2.31 |
| 5,064,432 | A * | 11/1991 | Reif | A61F 2/2403 |
| | | | | 623/2.33 |
| 5,171,263 | A * | 12/1992 | Boyer | F16K 15/03 |
| | | | | 137/527 |
| 5,824,062 | A * | 10/1998 | Patke | A61F 2/2403 |
| | | | | 623/2.26 |
| 6,296,663 | B1 * | 10/2001 | Patke | A61F 2/2403 |
| | | | | 623/2.28 |
| 8,181,669 | B2 | 5/2012 | Dehais et al. | |
| 8,800,596 | B2 | 8/2014 | Kamp et al. | |
| 9,464,724 | B2 | 10/2016 | Kamp et al. | |
| 9,518,668 | B2 | 12/2016 | Barone | |
| 9,651,160 | B2 | 5/2017 | Barone | |
| 9,890,864 | B2 | 2/2018 | Minta | |
| 10,228,070 | B2 | 3/2019 | Minta | |
| 10,309,551 | B2 | 6/2019 | Fiedziuk | |
| 10,487,740 | B2 | 11/2019 | Dehais | |
| 11,105,425 | B2 | 8/2021 | Feng et al. | |

* cited by examiner

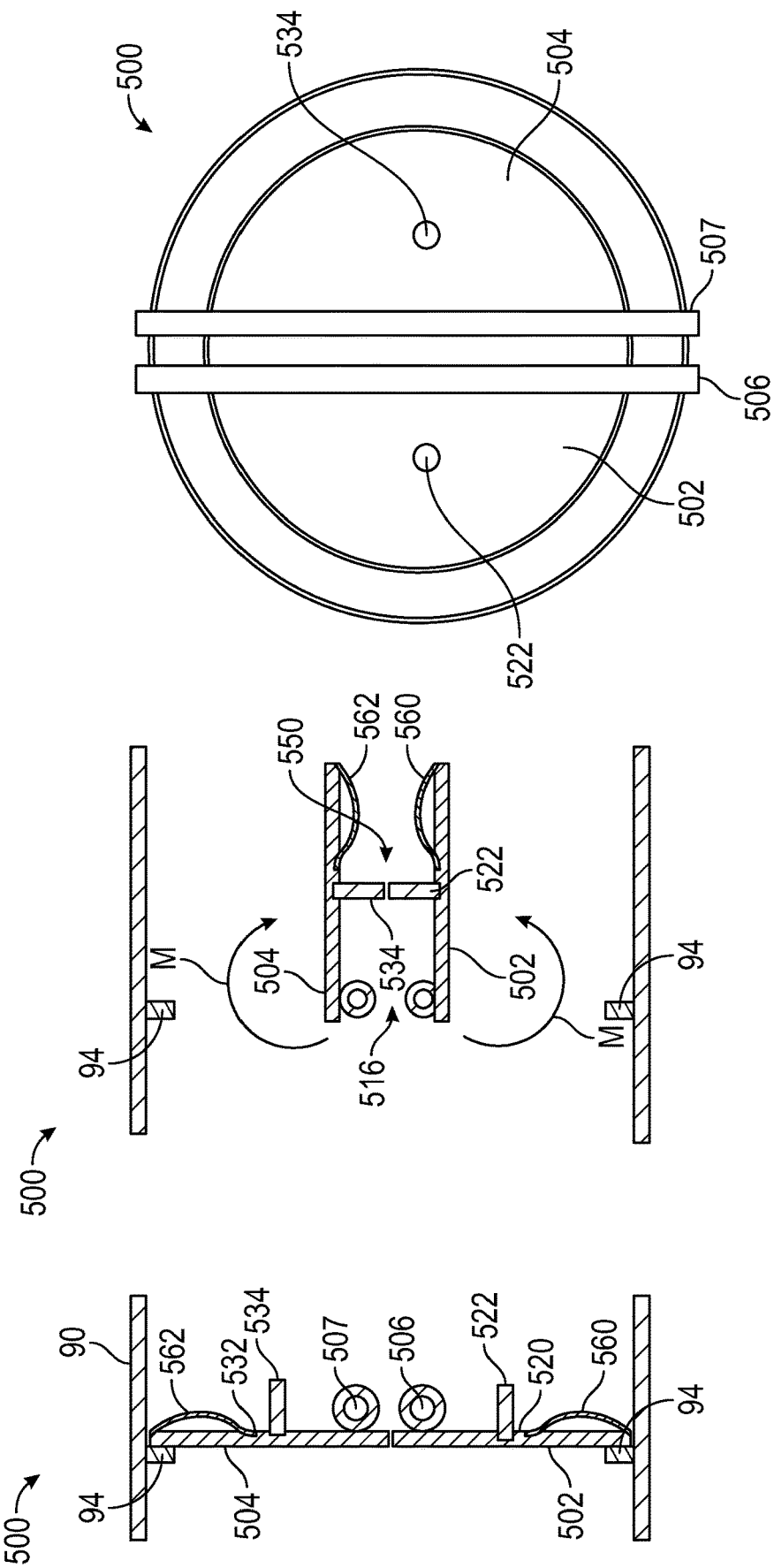

CHECK VALVE ASSEMBLY

TECHNICAL FIELD

The present disclosure relates to a check valve assembly. In particular, the present disclosure relates to an aerodynamically stable check valve assembly.

BACKGROUND

Gas turbine engines utilize check valves in supply pipes, such as, for example, air and fuel supply pipes. The check valves in supply pipes may protect against fluid loss in the event of a broken pipe. Traditional check valves may include a flapper configured to open and to close a passage through the pipe.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 21 shows a schematic, side cross-sectional view of a check valve assembly in a closed position, according to an embodiment of the present disclosure.

FIG. 22 shows a schematic, side cross-sectional view of the check valve assembly of FIG. 21 in an open position, according to an embodiment of the present disclosure.

FIG. 23 shows a schematic rear elevation view of the check valve assembly of FIG. 21, according to an embodiment of the present disclosure.

DETAILED DESCRIPTION

Figure 1:
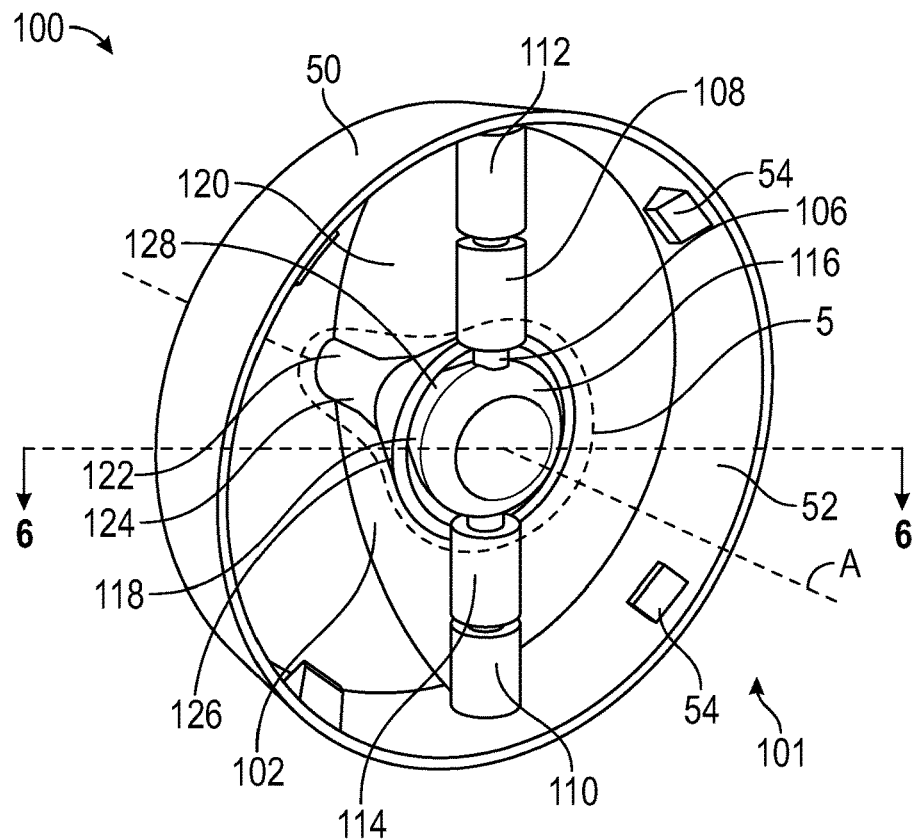
FIG. 1 shows a schematic, perspective elevation view of a check valve assembly, according to an embodiment of the present disclosure.

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

Oscillation of the flappers in a check valve assembly, when the check valve is open, is caused by a separated flow vibration on the flappers. This oscillation may cause wear on a pin or pins about which the flappers rotate. The oscillations may result in wear, fatigue, degradation, damage, or any combination thereof, to the flapper, to the pin, or to the flapper and the pin. The wear may result in detachment, failure, or both detachment and failure of the check valve assembly. The check valve assemblies of the present disclosure address the cause of the oscillations in the flappers of a check valve assembly, when the check valve assembly is in the open position, thus, avoiding or reducing wear and prolonging the life of the check valve assembly.

The technical effect of the check valve assemblies of the present disclosure provides an aerodynamic check valve assembly, avoiding or reducing wear and prolonging the life of the check valve assembly. In some examples, the check valve assemblies of the present disclosure are configured to generate an aerodynamic force that maintains the two flappers of the check valve in touching contact with each other when the check valve is in the open position. In some examples, the check valve assemblies of the present disclosure include a feature, such as a protrusion or stopper, that maintains the flappers at a predetermined angle without the flappers being in touching contact with each other. This may avoid wear or reduce wear to the flappers, to the pin, or to the flappers and the pin. The geometry of the two flappers of the present disclosure allows for the check valve to be in a fully open position while creating an internal passage through the two flappers. The internal passage includes a nozzle that generates low pressure between the adjacent flappers by accelerating the flow therethrough. The higher pressure (as compared to the internal passage) on the external faces of the flappers maintains the two flappers in touching contact or at the predetermined angle (without being in touching contact) with one another in a manner that eliminates or reduces separated flow vibration (e.g., causing oscillation of the flappers).

A check valve is a device that allows the flow of fluid in only one direction. The check valve includes an inlet and an outlet for the fluid to flow therethrough. As the fluid flows from the inlet to the outlet (e.g., in an upstream-to-downstream direction), the pressure acting on the valve member of the check valve causes the valve members to move to an open position permitting the fluid to flow from the inlet to the outlet. Thus, when there is no flow through the inlet, there is no pressure acting on the valve member and the check valve remains in the closed position. The valve member of the check valve is arranged such that flow from the outlet to the inlet does not cause the valve member to move to an open position and thus flow is not permitted from the outlet to the inlet. The valve member may be flappers, a ball, a hinged member, a diaphragm, a butterfly, etc. Accordingly, a check valve relies on a pressure differential to operate such that higher pressure on the inlet side of the valve member than on the outlet side of the valve member causes the valve member to open allowing flow through the check valve. When the pressure on the inlet side decreases or is less than the pressure on the outlet side, the valve closes.

FIGS. 1 to 8 show schematic views of a check valve assembly 100. The check valve assembly 100 may be mounted within a pipe 50, also referred to as a tube, a tubing, a housing, a frame, a flow passage, etc. Only a short section of the pipe 50 is shown to facilitate understanding of the check valve assembly 100. The pipe 50 may, however, be longer, may be may be coupled in fluid communication with other pipes 50, or both. The pipe may include an inner surface 52. One or more protrusions 54 may extend radially inward from the inner surface 52. The one or more protrusions 54 may operate to limit upward axial movement (e.g., movement toward the inlet end 101) of the flappers of the check valve assembly 100, as will be described with respect to FIG. 7.

Figure 2:
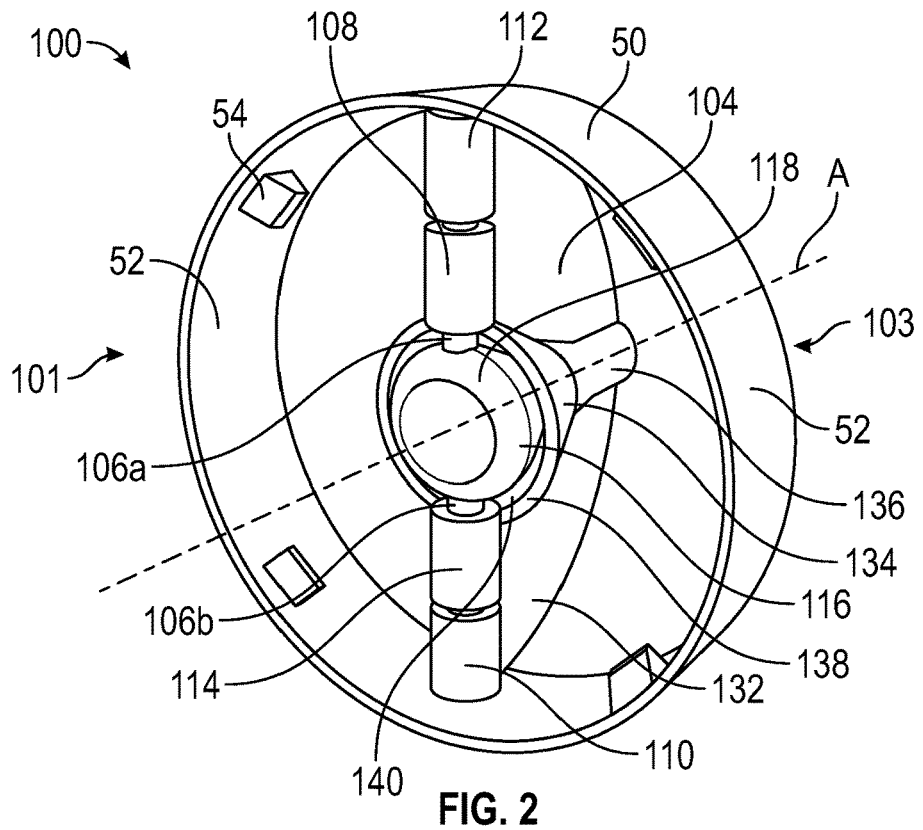
FIG. 2 shows a schematic, perspective elevation view of the check valve assembly of FIG. 1, according to an embodiment of the present disclosure.
Figure 7:
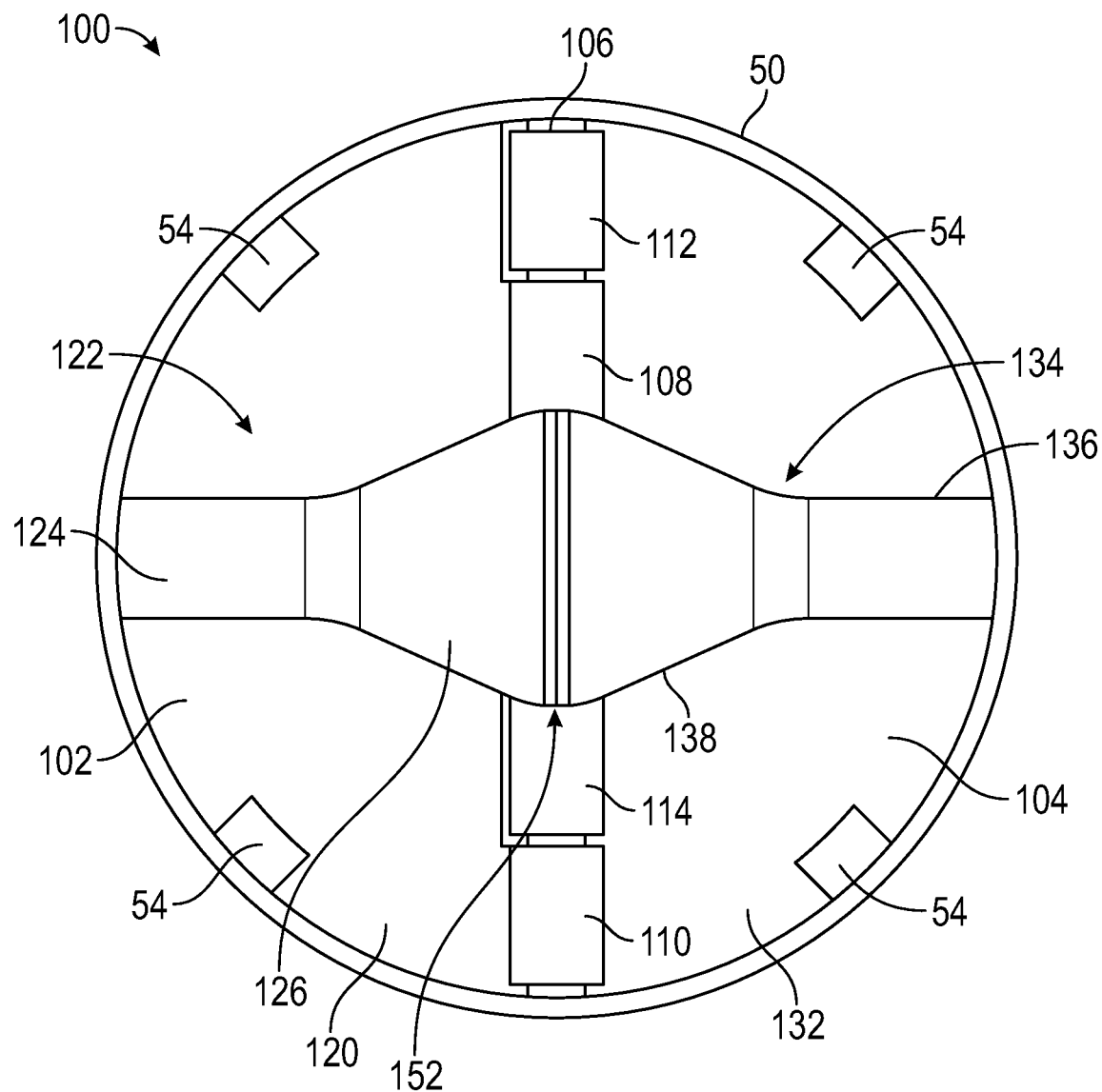
FIG. 7 shows a schematic, bottom view of the check valve assembly of FIG. 1 in a closed position, according to an embodiment of the present disclosure.

Referring first to FIGS. 1, 2, and 7, the check valve assembly 100 includes an inlet end 101 and an outlet end 103. During operation, fluid is caused to flow from the inlet end 101 to the outlet end 103. The check valve assembly 100 includes a first flapper 102, a second flapper 104, and a pin 106. The first flapper 102 and the second flapper 104 are pivotally connected to, and rotatable about the pin 106. The pin 106 may extend between opposing points on an inner surface 52 of the pipe 50. The first flapper 102 may include a first connection sleeve 108 and a second connection sleeve 110. The first connection sleeve 108 and the second connection sleeve 110 may be hollow tubular members that are configured to extend around the pin 106. In this manner, the first connection sleeve 108 and the second connection sleeve 110 move relative to the pin 106 such that the first flapper 102 may rotate or pivot between an open position (FIG. 1) and a closed position (FIG. 7). The second flapper 104 may include a third connection sleeve 112 and a fourth connection sleeve 114. The third connection sleeve 112 and the fourth connection sleeve 114 may be hollow tubular members that are configured to extend around the pin 106. In this manner, the third connection sleeve 112 and the fourth connection sleeve 114 move relative to the pin 106 such that the second flapper 104 may rotate or pivot between an open position (FIG. 1) and a closed position (FIG. 7).

The check valve assembly 100 includes a nozzle 116. The nozzle 116 is coupled to the pin 106. The nozzle 116 may be located a center of the pipe 50 such that an axis A is coaxial with a center axis of the pipe 50 and a center axis of the nozzle 116. The nozzle 116 may be connected to the pin 106 such that a first portion 106a of the pin 106 connects an outer surface 118 of the nozzle 116 to the inner surface 52 of the pipe 50 and a second portion 106b of the pin 106 connects an opposing point on the outer surface 118 of the nozzle 116 to an opposing point on the inner surface 52 of the pipe 50.

With continued reference to FIGS. 1, 2, and 7, the first flapper 102 has a first flapper body 120. The first flapper body 120 may be semi-circular in top view (see, e.g., FIG. 7). The first flapper body 120 includes a first flapper body protrusion 122 that includes a cylindrical protrusion portion 124 and a conical protrusion portion 126. As can be seen in FIGS. 1 and 2, the first flapper body protrusion 122 forms a like-shaped recess 128 on the opposing side surface of the first flapper 102, between the first flapper 102 and the nozzle 116. A first flapper flow passage 130 (FIG. 3) is located between the recess 128 and the outer surface 118 of the nozzle 116.

Again, referring to FIGS. 1, 2, and 7, the second flapper 104 has a second flapper body 132. The second flapper body 132 may be semi-circular in top view (see, e.g., FIG. 7). The second flapper body 132 includes a second flapper body protrusion 134 that includes a cylindrical protrusion portion 136 and a conical protrusion portion 138. As can be seen in FIGS. 1 and 2, the second flapper body protrusion 134 forms a like-shaped recess 140 on the opposing side surface of the second flapper 104, between the second flapper 104 and the nozzle 116. A second flapper flow passage 142 (FIG. 3) is located between the recess 140 and the outer surface 118 of the nozzle 116.

Figure 3:
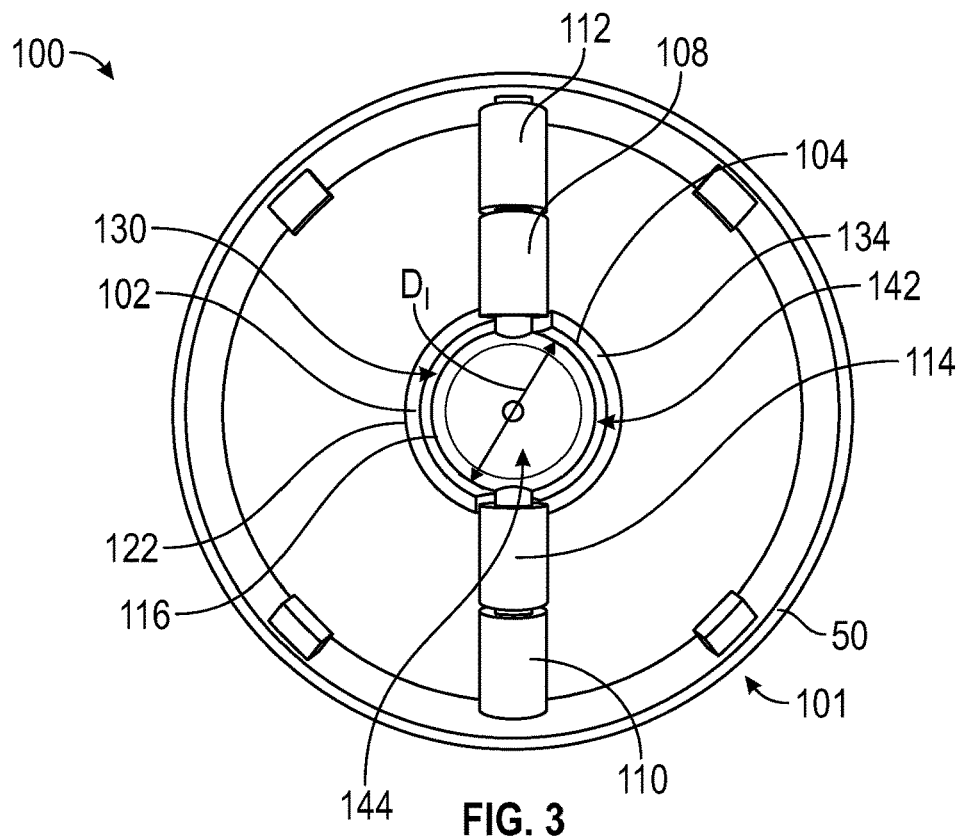
FIG. 3 shows a schematic, front elevation view of the check valve assembly of FIG. 1, according to an embodiment of the present disclosure.
Figure 4:
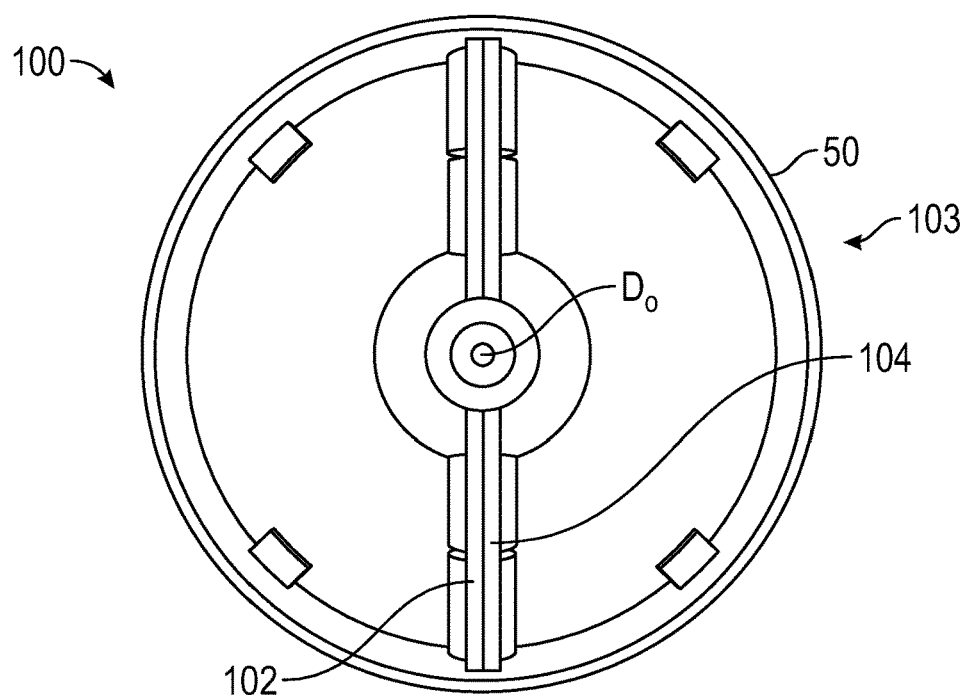
FIG. 4 shows a schematic, rear elevation view of the check valve assembly of FIG. 1, according to an embodiment of the present disclosure.
Figure 5:
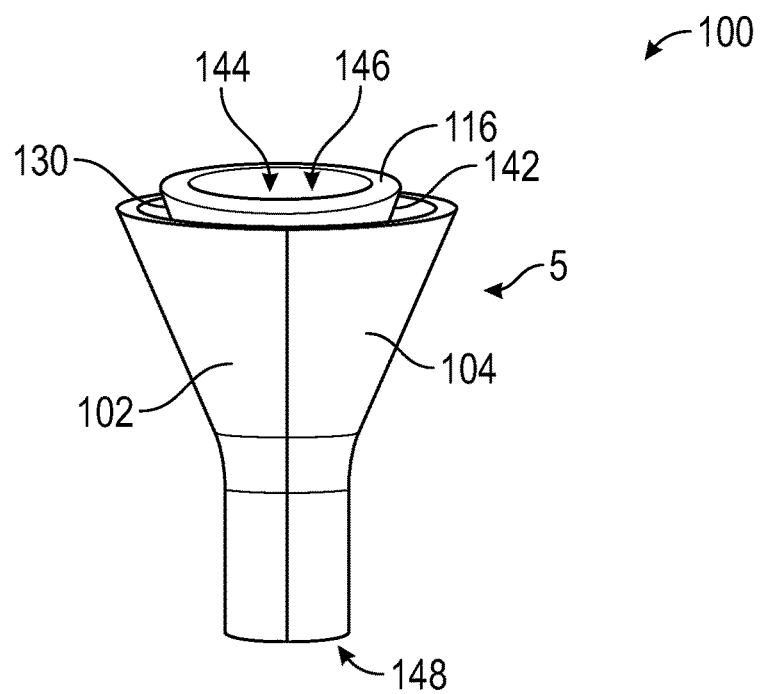
FIG. 5 shows a schematic, perspective view of a detailed section 5 of the check valve assembly of FIG. 1, according to an embodiment of the present disclosure.

FIGS. 3 and 4 show top and bottom views, respectively, of the check valve assembly 100 connected to the pipe 50. FIG. 3 shows the first flapper flow passage 130 extending between the nozzle 116 and the first flapper body protrusion 122 of the first flapper 102. The second flapper flow passage 142 extends between the nozzle 116 and the second flapper body protrusion 134 of the second flapper 104. The nozzle 116 includes a nozzle passage 144 extending axially through the nozzle 116. The nozzle passage 144 may have an inner diameter Di at the inlet 146 (FIG. 5) that is greater than an inner diameter Do (FIG. 4) at the outlet 148 (FIG. 5). That is, an inner diameter of the nozzle 116 and the nozzle passage 144 may taper in an axially upstream-to-downstream direction.

FIG. 5 shows a detailed section 5 of the check valve assembly 100 with the pipe 50 and pin 106 removed, for clarity. As shown in FIG. 5, the first flapper flow passage 130 allows flow between the first flapper 102 and the nozzle 116 when the check valve assembly 100 is in an open position. The second flapper flow passage 142 allows flow between the second flapper 104 and the nozzle 116 when the check valve assembly 100 is open. The nozzle passage 144 allows flow through the nozzle 116 when the check valve assembly 100 is open.

Figure 6:
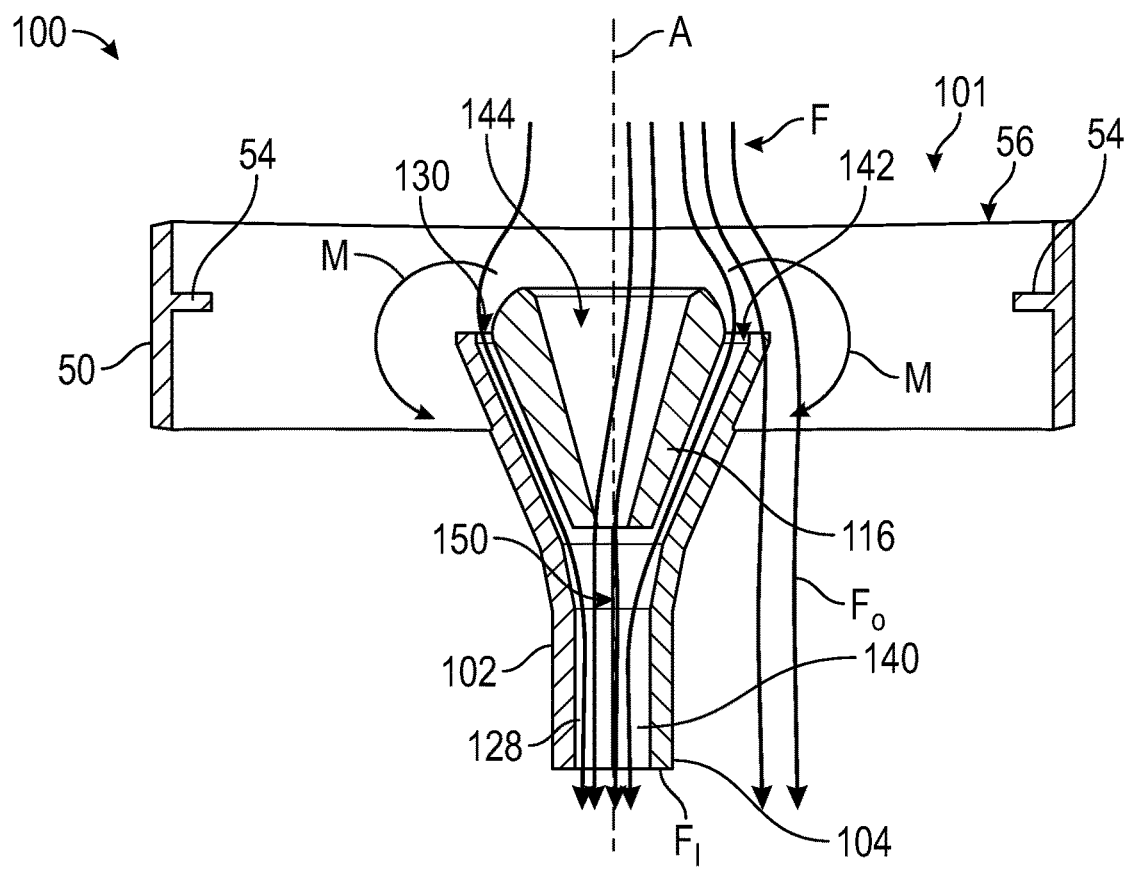
FIG. 6 shows a schematic, cross-sectional view of the check valve assembly of FIG. 1, taken along line 6-6 of FIG. 1, according to an embodiment of the present disclosure.

Referring to FIG. 6, a cross-sectional view of the check valve assembly 100 and pipe 50 are shown taken through the centerline axis A. A fluid flow F represented by the flow lines, in an upstream-to-downstream flow, may enter the pipe 50 from an inlet end 56. The fluid flow F enters the check valve assembly 100 through the first flapper flow passage 130, the second flapper flow passage 142, and the nozzle passage 144. The fluid flow F may then flow through an interior passage, also referred to as a combined flow passage 150. The combined flow passage 150 may be formed by the recess 128 of the first flapper 102 and the recess 140 of the second flapper 104. That is, the recess 128 and the recess 140 together form a cylindrical combined flow passage 150, as shown in FIG. 6.

During operation, the flow $F_1$ through the inside of the open check valve assembly 100 of FIG. 6 may induce a low pressure in the combined flow passage 150. The flow $F_o$ outside of the open check valve assembly 100 and through the pipe 50 may generate a pressure greater than the low pressure within the combined flow passage 150. Stated another way, the configuration of the nozzle 116, the first flapper 102, the second flapper 104, the combined flow passage 150, and flows contained therewith may be configured to generate a lower pressure flow $F_1$ than the flow $F_o$. This greater pressure in the flow $F_o$ may induce a bending moment M about the upper ends (e.g. near or at the connection sleeves 108, 110, 112, 114 or pin 106) of the first flapper 102 and the second flapper 104, thus, maintaining the first flapper 102 and the second flapper 104 in the open position shown in FIG. 6.

Figure 8:
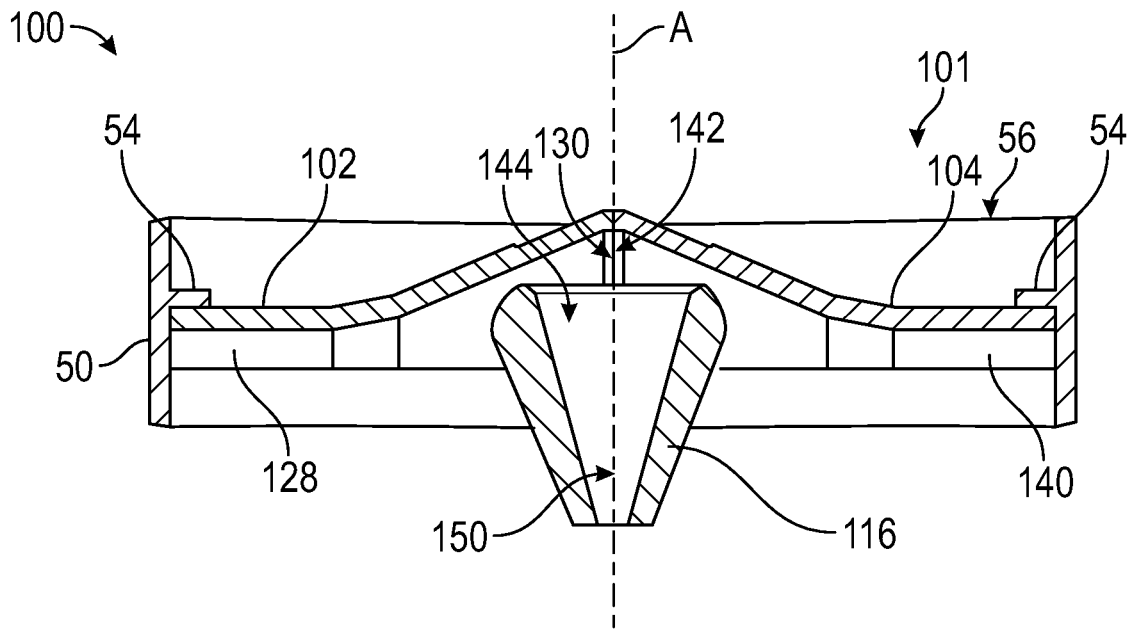
FIG. 8 shows a schematic, cross-sectional view of the check valve assembly of FIG. 1, taken along line 6-6, in the closed position of FIG. 7, according to an embodiment of the present disclosure.

In the closed position of FIG. 7 and FIG. 8, the check valve assembly 100 may prevent or reduce substantive fluid flow through the pipe 50. The protrusions 54 may prevent the first flapper 102 and the second flapper 104 from rotating away from the closed position shown in FIG. 7 and toward the inlet end 101. The nozzle 116 is not visible in the closed position of FIG. 7. An upper surface of the conical protrusion portion 126 of the first flapper 102 and an upper surface of the conical protrusion portion 138 of the second flapper 104 mate at location 152 to block the nozzle 116 and prevent flow therethrough.

Accordingly, and with reference to FIGS. 1 to 8, the geometry of the first flapper 102 and the second flapper 104 allows for the flappers 102, 104 to be in a fully open position while creating the internal passage or combined flow passage 150. The nozzle 116 generates low pressure in the flow $F_1$ between the first flapper 102 and the second flapper 104 by accelerating the flow through the nozzle passage 144 of the nozzle 116. The flow $F_o$ has a higher pressure than the flow $F_1$, the higher pressure acts on the external faces of the first flapper 102 and the second flapper 104 (e.g., the faces or surfaces external to the combined flow passage 150). This causes a moment M on the flappers, maintaining the first flapper 102 and the second flapper 104 together in touching contact. This eliminates or reduces separated flow vibration.

FIGS. 9 to 16 show schematic views of a check valve assembly 200. The check valve assembly 200 may be mounted within a pipe 60, also referred to as a tube, a tubing, a housing, a frame, a flow passage, etc. Only a short section of the pipe 60 is shown to facilitate understanding of the check valve assembly 200. The pipe 60 may, however, be longer, may be coupled in fluid communication with other pipes 60, or both. The pipe may include an inner surface 62.

One or more protrusions 64 may extend radially inward from the inner surface 62. The one or more protrusions may operate to limit upward axial movement of the flappers of the check valve assembly 100, as will be described with respect to FIG. 15.

Figure 9:
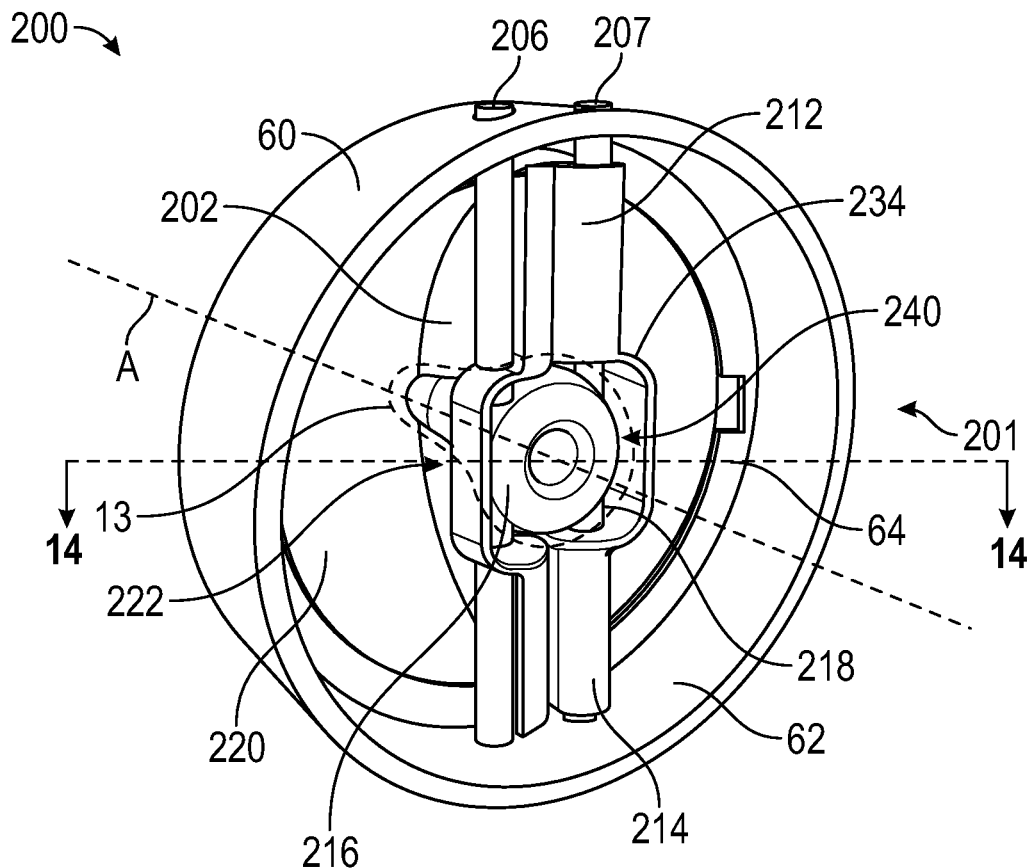
FIG. 9 shows a schematic, perspective elevation view of a check valve assembly, according to an embodiment of the present disclosure.
Figure 10:
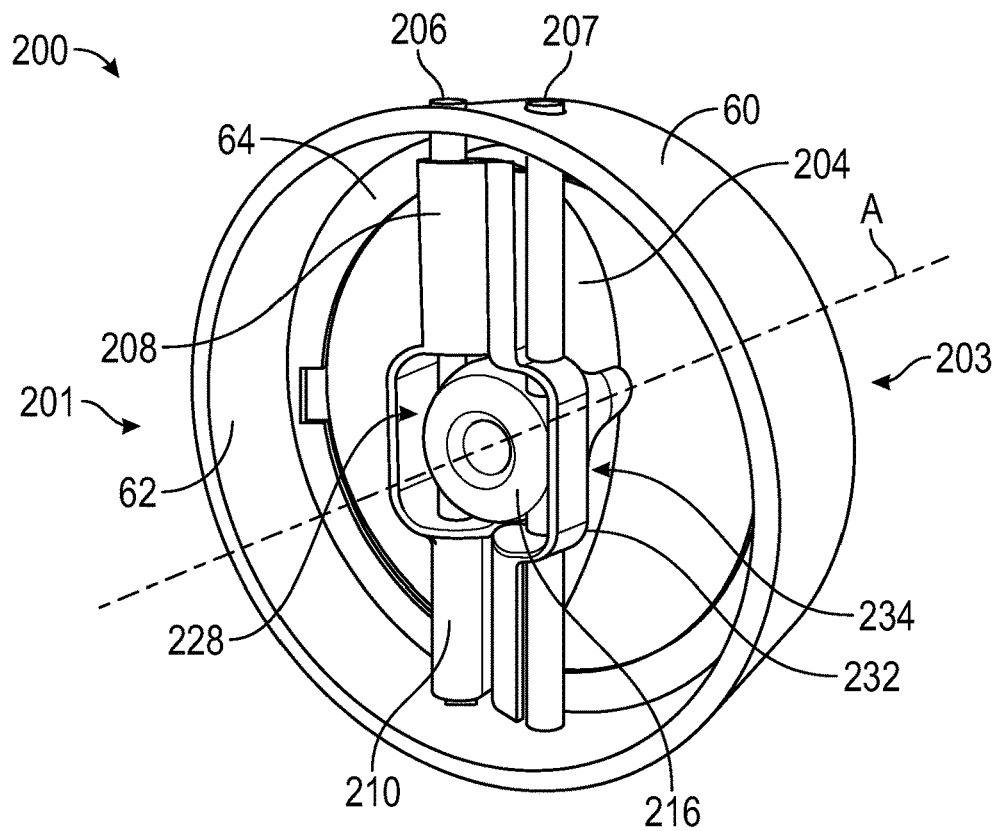
FIG. 10 shows a schematic, perspective elevation view of the check valve assembly of FIG. 9, according to an embodiment of the present disclosure.
Figure 15:
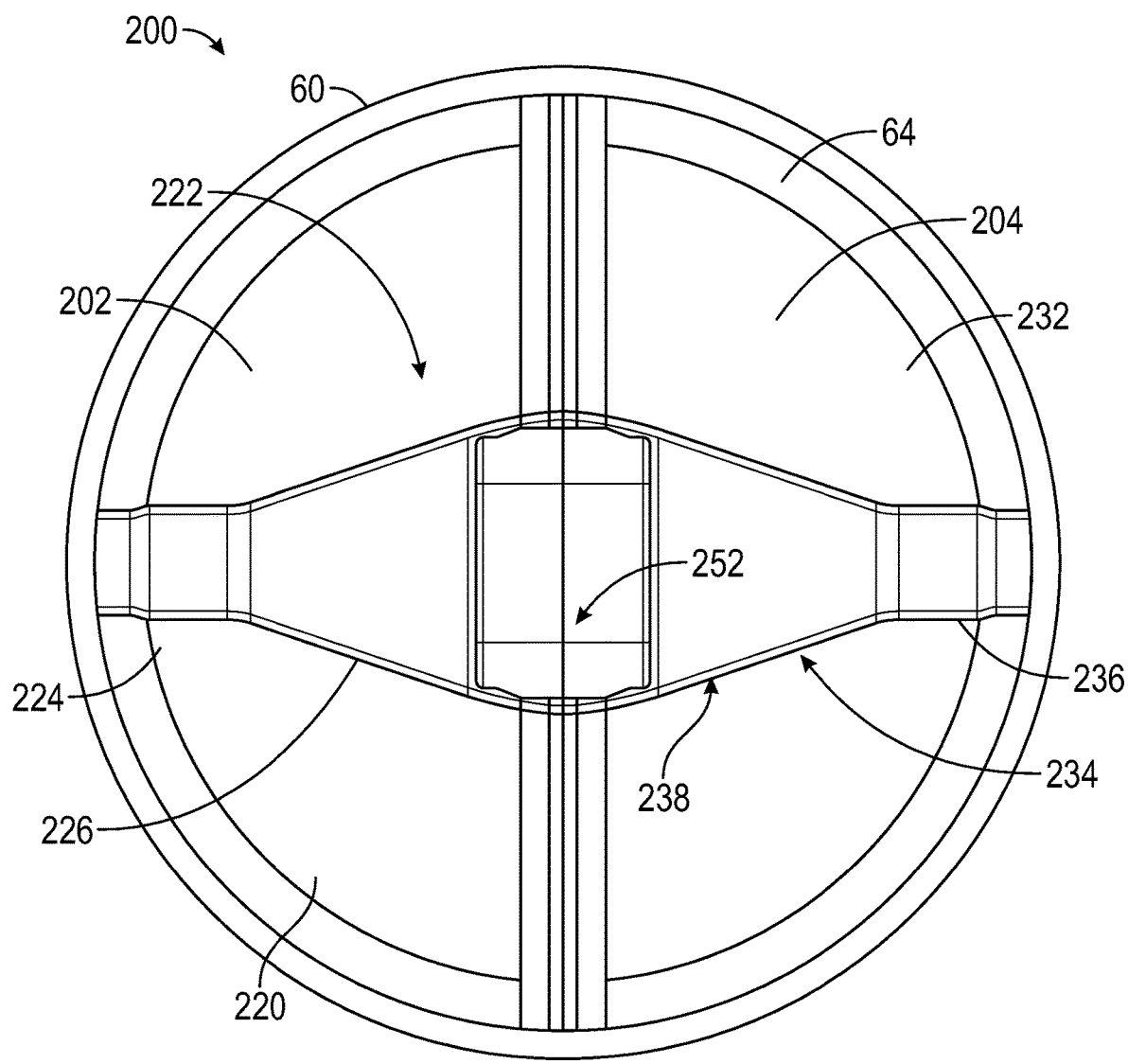
FIG. 15 shows a schematic, bottom view of the check valve assembly of FIG. 8 in a closed position, according to an embodiment of the present disclosure.

Referring first to FIGS. 8, 9, and 10, the check valve assembly 200 includes an inlet end 201 and an outlet end 203. During operation, fluid is caused to flow from the inlet end 201 to the outlet end 203. The check valve assembly 100 includes a first flapper 202, a second flapper 204, a first pin 206, and a second pin 207. The first flapper 202 is pivotally connected to the first pin 206 and the second flapper 204 is pivotally connected to the second pin 207. The first pin 206 and the second pin 207 may extend between opposing points on an inner surface 62 of the pipe 60. The first flapper 202 may include a first connection sleeve 208 and a second connection sleeve 210. The first connection sleeve 208 and the second connection sleeve 210 may be hollow tubular members that are configured to extend around the first pin 206. In this manner, the first connection sleeve 208 and the second connection sleeve 210 move relative to the first pin 206 such that the first flapper 202 may rotate or pivot between an open position (FIG. 9) and a closed position (FIG. 15). The second flapper 204 may include a third connection sleeve 212 and a fourth connection sleeve 214. The third connection sleeve 212 and the fourth connection sleeve 214 may be hollow tubular members that are configured to extend around the second pin 207. In this manner, the third connection sleeve 212 and the fourth connection sleeve 214 move relative to the second pin 207 such that the second flapper 204 may rotate or pivot between an open position (FIG. 9) and a closed position (FIG. 15).

The check valve assembly 200 includes a nozzle 216. The nozzle 216 is coupled to the first pin 206 and the second pin 207. The nozzle 216 may be located at a center of the pipe 60 such that an axis A is a center axis of the pipe 60 and a center axis of the nozzle 216. The nozzle 216 may be connected to the first pin 206 and the second pin 207 such that the first pin 206 and the second pin 207 connect an outer surface 218 of the nozzle 216 to the inner surface 62 of the pipe 60 on opposing sides of the pipe 60.

With continued reference to FIGS. 9, 10, and 15, the first flapper 202 has a first flapper body 220. The first flapper body 220 may be semi-circular in top view (see, e.g., FIG. 15). The first flapper body 220 includes a first flapper body protrusion 222 that includes a cylindrical protrusion portion 224 and a conical protrusion portion 226. As can be seen in FIGS. 9 and 10, the first flapper body protrusion 222 forms a like shaped recess 228 on the opposing side surface of the first flapper 202. A first flapper flow passage 230 (FIG. 11) is located between the recess 228 and the outer surface 218 of the nozzle 216. Again, referring to FIGS. 9, 10, and 15, the second flapper 204 has a second flapper body 232. The second flapper body 232 may be semi-circular in top view (see, e.g., FIG. 15). The second flapper body 232 includes a second flapper body protrusion 234 that includes a cylindrical protrusion portion 236 and a conical protrusion portion 238. As can be seen in FIGS. 9 and 10, the second flapper body protrusion 234 forms a like shaped recess 240 on the opposing side surface of the second flapper 204. A second flapper flow passage 242 (FIG. 11) is located between the recess 240 and the outer surface 218 of the nozzle 216.

Figure 11:
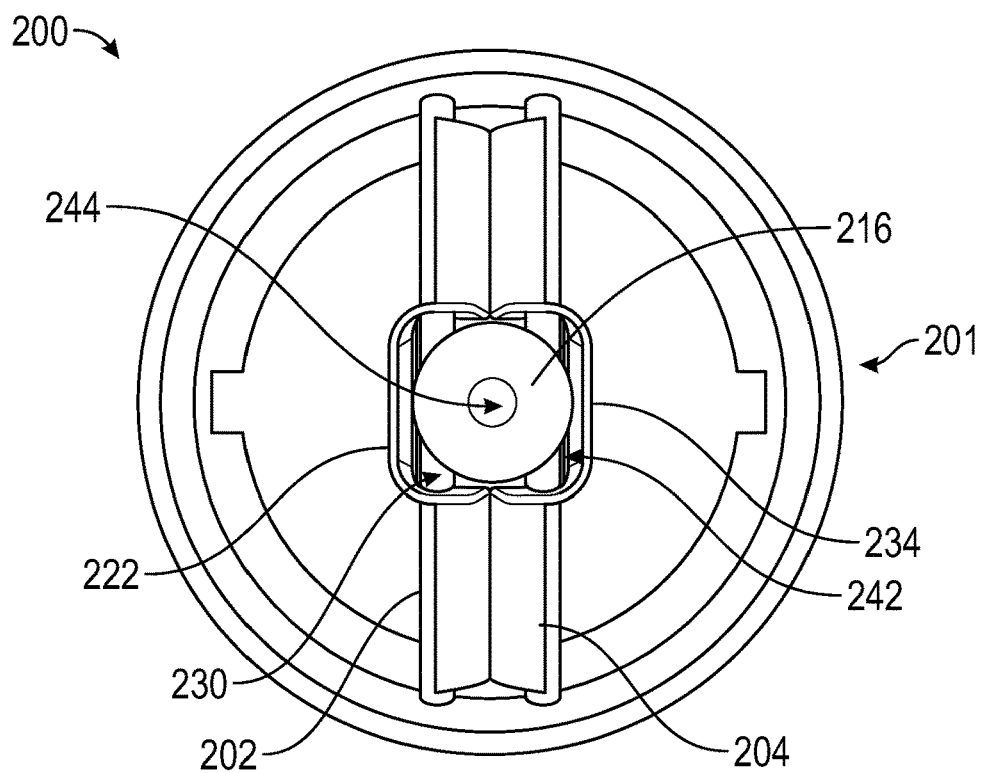
FIG. 11 shows a schematic, front elevation view of the check valve assembly of FIG. 9, according to an embodiment of the present disclosure.
Figure 12:
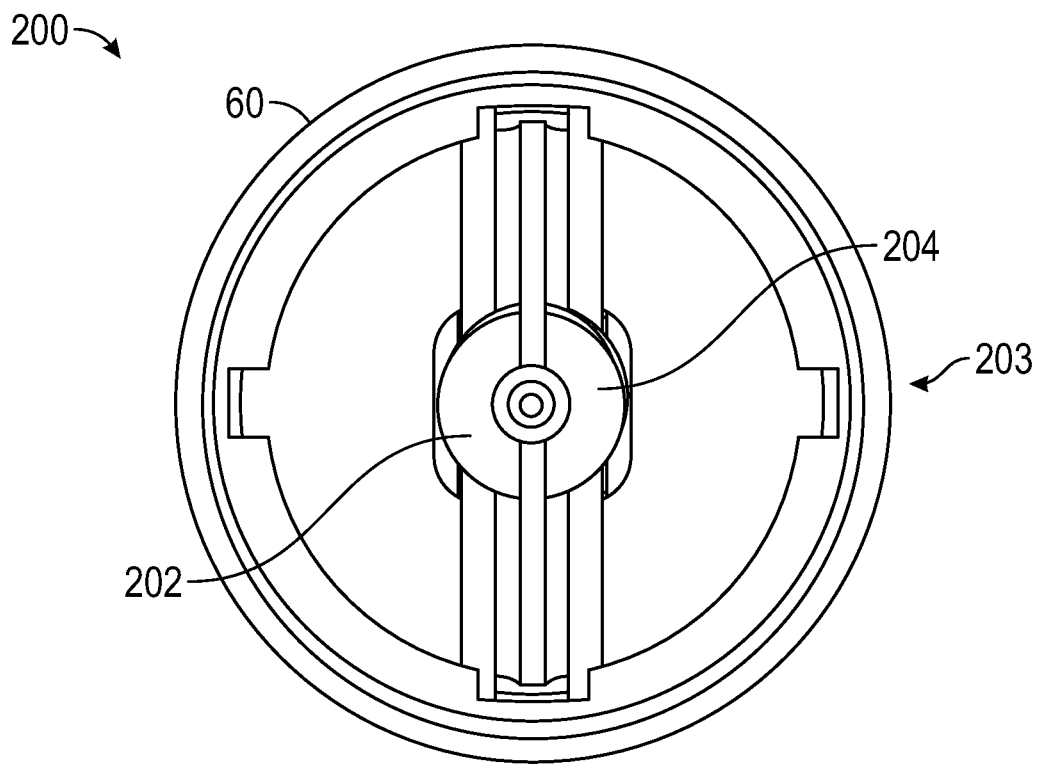
FIG. 12 shows a schematic, rear elevation view of the check valve assembly of FIG. 9, according to an embodiment of the present disclosure.

FIGS. 11 and 12 show top and bottom views, respectively, of the check valve assembly 200 connected to the pipe 60. FIG. 11 shows the first flapper flow passage 230 extending between the nozzle 216 and the first flapper body protrusion 222 of the first flapper 202. The second flapper flow passage 242 extends between the nozzle 216 and the second flapper body protrusion 234 of the second flapper 204. The nozzle 216 includes a nozzle passage 244 extending axially through the nozzle 216. The nozzle passage 244 may taper in a manner similar to, or the same as, the nozzle passage 144 described with respect to FIGS. 3 and 4.

Figure 13:
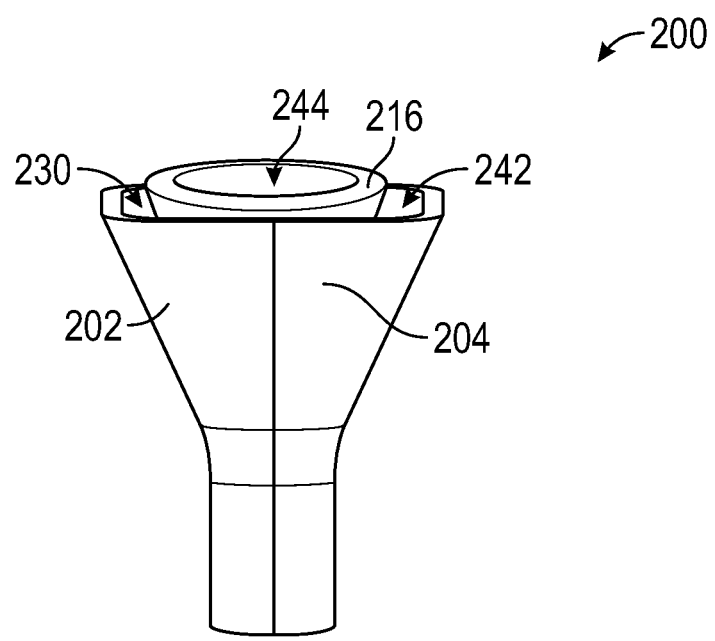
FIG. 13 shows a schematic, perspective view of a detailed section 13 or the check valve assembly of FIG. 9, according to an embodiment of the present disclosure.

For clarity, FIG. 13 shows the check valve assembly 200 with the pipe 60 and pins 206, 207 removed. As shown in FIG. 13, the first flapper flow passage 230 allows flow between the first flapper 202 and the nozzle 216 when the check valve assembly 200 is in an open position. The second flapper flow passage 242 allows flow between the second flapper 204 and the nozzle 216 when the check valve assembly 200 is open. The nozzle passage 244 allows flow through the nozzle 216 when the check valve assembly 200 is open.

Figure 14:
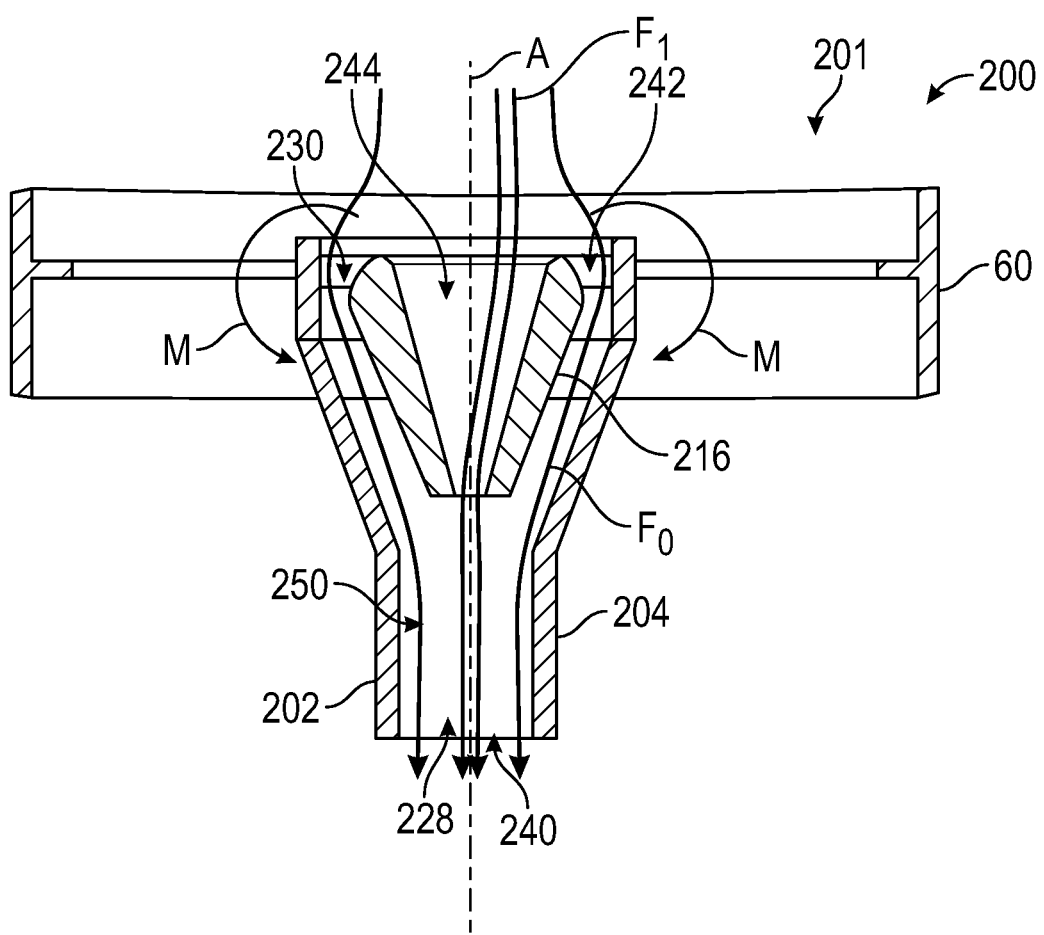
FIG. 14 shows a schematic, cross-sectional view of the check valve assembly of FIG. 9, taken along line 14-14 of FIG. 9, according to an embodiment of the present disclosure.

Referring to FIG. 14, a cross-sectional view of the check valve assembly 200 and the pipe 60 are shown taken through the centerline axis A. A fluid flow F represented by the flow lines in FIG. 14, may enter the pipe 60 from the inlet end 201. The fluid flow F enters the check valve assembly 200 through the first flapper flow passage 230, the second flapper flow passage 242, and the nozzle passage 244. The fluid flow F may then flow through a combined flow passage 250. The combined flow passage 250 may be formed by the recess 228 of the first flapper 202 and the recess 240 of the second flapper 204. That is, the recess 228 and the recess 240 together form a cylindrical combined flow passage 250, as shown in FIG. 14.

During operation, the flow $F_1$ through the inside of the open check valve assembly 200 of FIG. 14 may induce a low pressure in the combined flow passage 250. The flow $F_o$ outside of the open check valve assembly 200 and through the pipe 60 may generate a pressure greater than the low pressure within the combined flow passage 250. This greater pressure in the flow $F_o$ may induce a bending moment M about the upper ends of the first flapper 202 and the second flapper 204, thus, maintaining the first flapper 202 and the second flapper 204 in the open position shown in FIG. 14.

Figure 16:
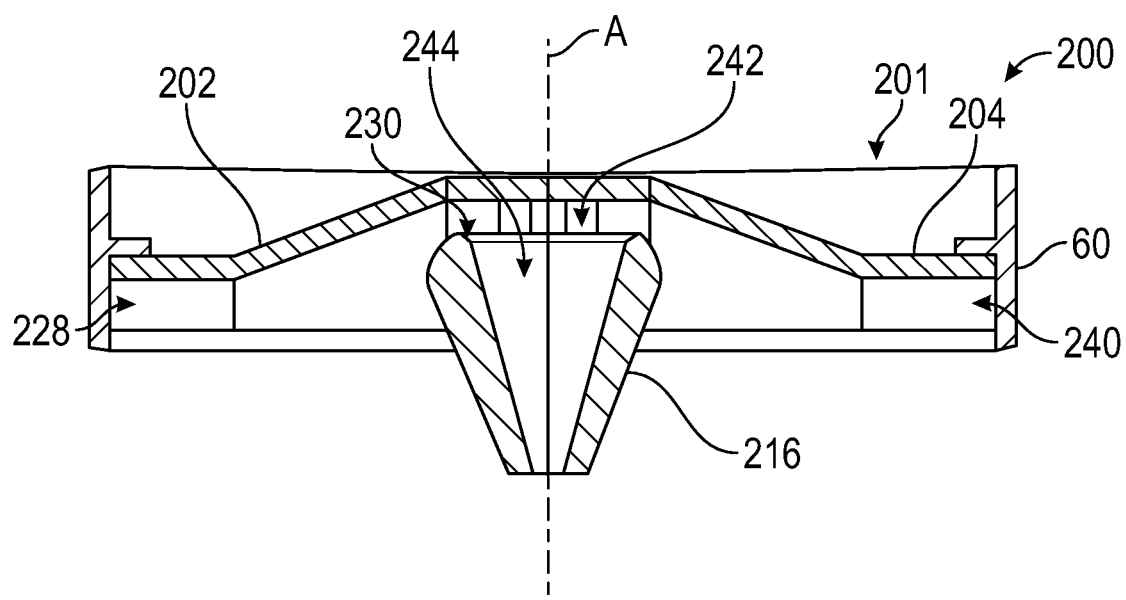
FIG. 16 shows a schematic, cross-sectional view of the check valve assembly of FIG. 9, taken along line 14-14, in the closed position of FIG. 15, according to an embodiment of the present disclosure.

In the closed position of FIG. 15 and FIG. 16, the check valve assembly 200 may prevent flow through the pipe 60. The protrusions 64 may prevent the first flapper 202 and the second flapper 204 from rotating away from the closed position shown in FIG. 15 and toward the inlet end 201. The nozzle 216 is not visible or accessible in the closed position of FIG. 15. An upper surface of the conical protrusion portion 226 of the first flapper 202 and an upper surface of the conical protrusion portion 238 of the second flapper 204 mate at location 252 to block the nozzle 216 and prevent or substantively reduce flow therethrough.

Accordingly, and with reference to FIGS. 9 to 16, the geometry of the first flapper 202 and the second flapper 204 allows for the flappers to be in a fully open position while creating the internal passage, combined flow passage 250. The nozzle 216 generates low pressure in the flow between the first flapper 202 and the second flapper 204 by accelerating the flow through the nozzle passage 244 of the nozzle 216. The flow outside of the flappers (e.g., outside the combined flow passage 250) has a higher pressure than the flow in the combined flow passage 250. The higher pressure acts on the external faces of the first flapper 202 and the second flapper 204 (e.g., the faces or surfaces external to the combined flow passage 250). This causes a moment M on the flappers, maintaining the first flapper 202 and the second flapper 204 together in touching contact. This eliminates or reduces separated flow vibration.

Figure 18:
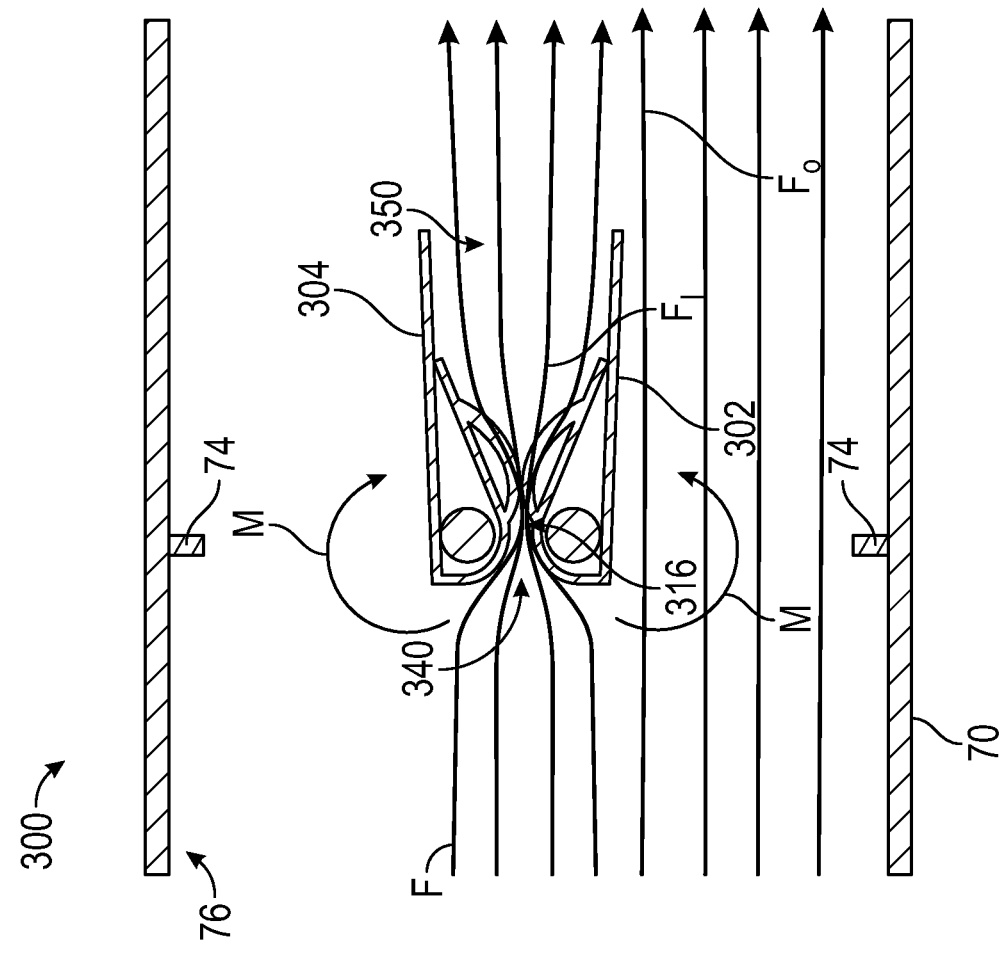
FIG. 18 shows a schematic, side cross-sectional view of the check valve assembly of FIG. 17 in an open position, according to an embodiment of the present disclosure.
Figure 17:
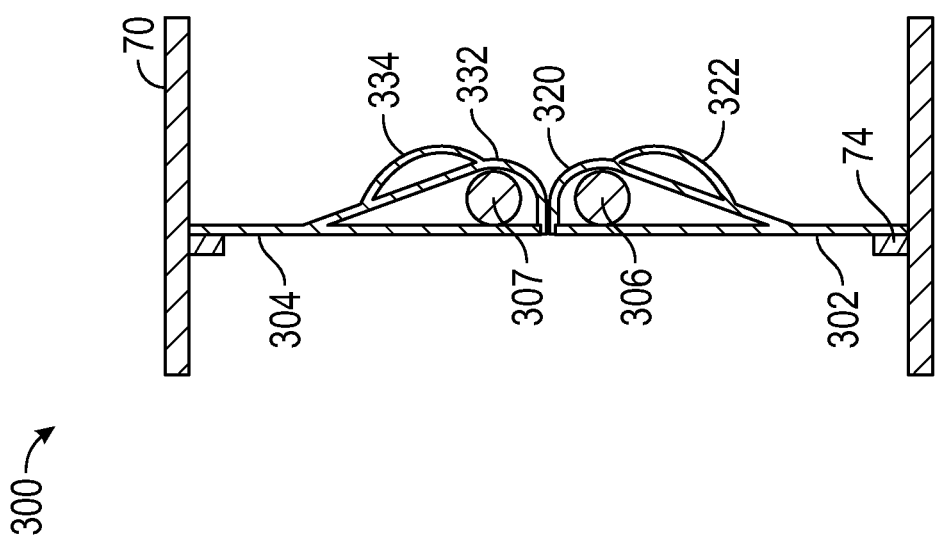
FIG. 17 shows a schematic, side cross-sectional view of a check valve assembly in a closed position, according to an embodiment of the present disclosure.

FIGS. 17 and 18 show schematic views of a check valve assembly 300 coupled to a pipe 70. The check valve assembly 300 includes a first flapper 302, a second flapper 304, a first pin 306, and a second pin 307. The first flapper 302 is pivotally connected to the first pin 306 and the second flapper 304 is pivotally connected to the second pin 307. The first pin 306 and the second pin 307 may extend between opposing points on an inner surface of the pipe 70, as described with respect to other embodiments. The first flapper 302 may be curved or bent over the first pin 306 to allow relative rotation of the first flapper 302 with respect to the first pin 306. The second flapper 304 may be curved or bent over the second pin 307 to allow relative rotation of the second flapper 304 with respect to the second pin 307. Thus, the first flapper 302 and the second flapper 304 may rotate between an open position (FIG. 18) and a closed position (FIG. 17). One or more protrusions 74 may extend radially inward from an inner surface of the pipe 70. The one or more protrusions 74 may operate to limit upward axial movement of the flappers of the check valve assembly 300.

The check valve assembly 300 includes a nozzle 316 formed by the first flapper 302 and the second flapper 304 in the open position, as shown in FIG. 18. The first flapper 302 has a first flapper body 320. The first flapper body 320 Includes a first flapper body protrusion 322. The second flapper 304 has a second flapper body 332. The second flapper body 332 includes a second flapper body protrusion 334. When in the open position of FIG. 18, the first flapper body protrusion 322 and the second flapper body protrusion 334 are located adjacent to one another. The first flapper body protrusion 322 and the second flapper body protrusion 334 may provide proper spacing of the first flapper 302 and the second flapper 304 such that a low pressure flow is capable of being formed between the first flapper 302 and the second flapper 304.

A fluid flow F, represented by the flow lines in FIG. 18, may enter the pipe 70 from an inlet end 76. The fluid flow F enters the check valve assembly 300 through an opening 340 formed by the adjacent flapper bodies 320 and 332. The fluid flow F may flow through the opening 340, through the nozzle 316, and through a combined flow passage 350 formed by the adjacent flapper bodies 320 and 332. During operation, the flow $F_1$ through the inside of the open check valve assembly 300 may induce a low pressure in the combined flow passage 350. The flow $F_o$ outside of the open check valve assembly 300 and through the pipe 70 may generate a pressure greater than the low pressure within the combined flow passage 350. This greater pressure in the flow $F_o$ may induce a bending moment about the upper ends of the first flapper 302 and the second flapper 304, thus, maintaining the first flapper 302 and the second flapper 304 in the open position shown in FIG. 18. In the closed position of FIG. 17, the check valve assembly 300 may prevent flow through the pipe 70.

In some examples, the first flapper body protrusion 322 and the second flapper body protrusion 334 are formed unitarily with a surface of the first flapper 302 and the second flapper 304, respectively. In some examples, the first flapper body protrusion 322 and the second flapper body protrusion 334 are formed separately of the first flapper 302 and the second flapper 304, respectively, and coupled thereto. The first flapper body protrusion 322 and the second flapper body protrusion 334 may be bumps or pins extending from the surface of the first flapper 302 and the second flapper 304. The first flapper body protrusion 322 and the second flapper body protrusion 334 may maintain the first flapper 302 and the second flapper 304 at a predetermined angle when the check valve assembly 300 is in the open position. In the example of FIGS. 17 and 18, the first flapper 302 and the second flapper 304 may be formed of sheet metal.

As discussed previously, and with reference to FIGS. 17 and 18, the geometry of the first flapper 302 and the second flapper 304 allows for the flappers to be in a fully open position while creating the internal passage, combined flow passage 350. The nozzle 316 generates low pressure in the flow between the first flapper 302 and the second flapper 304 by accelerating the flow through the nozzle passage of the nozzle 316. The flow outside of the flappers (e.g., outside combined flow passage 350) has a higher pressure than the flow in the combined flow passage 350. The higher pressure acts on the external faces of the first flapper 302 and the second flapper 304 (e.g., the faces or surfaces external to the combined flow passage 350). This causes a moment on the flappers, maintaining the first flapper 302 and the second flapper 304 together at a predetermined angle (due to the first flapper body protrusion 322 and the second flapper body protrusion 334) without being in touching contact. This eliminates or reduces separated flow vibration.

Figure 20:
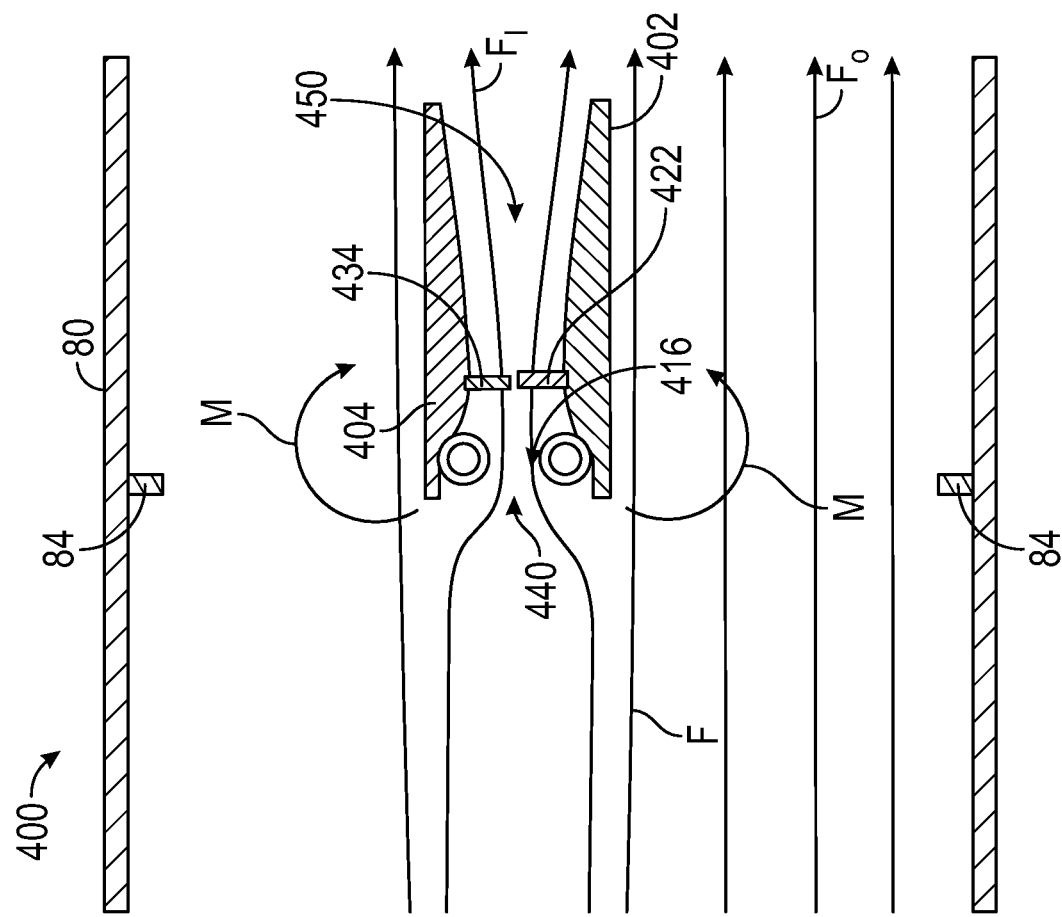
FIG. 20 shows a schematic, side cross-sectional view of the check valve assembly of FIG. 19 in an open position, according to an embodiment of the present disclosure.
Figure 19:
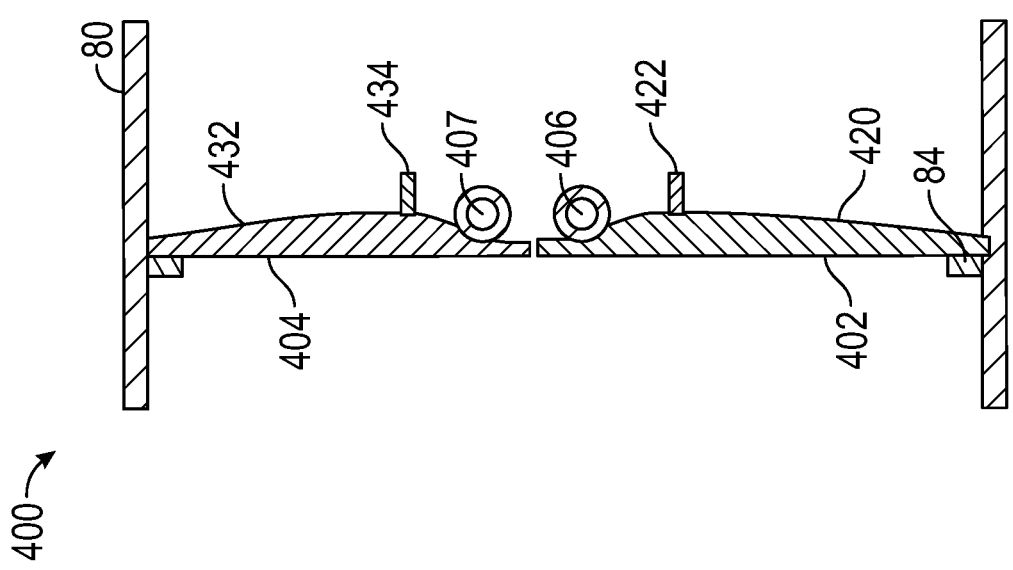
FIG. 19 shows a schematic, side cross-sectional view of a check valve assembly in a closed position, according to an embodiment of the present disclosure.

FIGS. 19 and 20 show schematic views of a check valve assembly 400 coupled to a pipe 80. The check valve assembly 400 includes a first flapper 402, a second flapper 404, a first pin 406, and a second pin 407. The first flapper 402 is pivotally connected to the first pin 406 and the second flapper 404 is pivotally connected to the second pin 407. The first pin 406 and the second pin 407 may extend between opposing points on an inner surface of the pipe 80, as described with respect to other embodiments. The first flapper 402 may be pivotally coupled to the first pin 406 to allow relative rotation of the first flapper 402 with respect to the first pin 406. The second flapper 404 may be pivotally coupled to the second pin 407 to allow relative rotation of the second flapper 404 with respect to the second pin 407. Thus, the first flapper 302 and the second flapper 304 may rotate between an open position (FIG. 20) and a closed position (FIG. 19). One or more protrusions 84 may extend radially inward from an inner surface of the pipe 80. The one or more protrusions 84 may operate to limit upward axial movement of the flappers of the check valve assembly 400.

The check valve assembly 400 includes a nozzle 416 formed by the first flapper 402 and the second flapper 404 in the open position, as shown in FIG. 20. The first flapper 402 has a first flapper body 420. The first flapper body 420 includes a first flapper body protrusion 422. The second flapper 404 has a second flapper body 432. The second flapper body 432 includes a second flapper body protrusion 434. When in the open position of FIG. 20, the first flapper body protrusion 422 and the second flapper body protrusion 434 are located adjacent to one another. The first flapper body protrusion 422 and the second flapper body protrusion 434 may provide proper spacing of the first flapper 402 and the second flapper 404 such that a low pressure flow is capable of being formed between the first flapper 402 and the second flapper 404.

A fluid flow F, represented by the flow lines in FIG. 20, may enter the pipe 80 from an inlet end. The fluid flow F enters the check valve assembly 400 through an opening 440 formed by the adjacent flapper bodies 420 and 432. The fluid flow F may flow through the opening 440, through the nozzle 416, and through a combined flow passage 450 formed by the adjacent flapper bodies 420 and 432. During operation, a flow $F_1$ through the inside of the open check valve assembly 400 may induce a low pressure in the combined flow passage. The flow $F_o$ outside of the open check valve assembly 400 and through the pipe 80 may generate a pressure greater than the low pressure within the combined flow passage. This greater pressure in the flow $F_o$ may induce a bending moment M about the upper ends of the first flapper 402 and the second flapper 404, thus, maintaining the first flapper 402 and the second flapper 404 in the open position shown in FIG. 20. In the closed position of FIG. 19, the check valve assembly 400 may prevent flow through the pipe 80.

In some examples, the first flapper body protrusion 422 and the second flapper body protrusion 434 are formed unitarily with a surface of the first flapper 402 and the second flapper 404, respectively. In some examples, the first flapper body protrusion 422 and the second flapper body protrusion 434 are formed separately of the first flapper 402 and the second flapper 404, respectively, and coupled thereto. The first flapper body protrusion 422 and the second flapper body protrusion 434 may be bumps or pins extending from the surface of the first flapper 402 and the second flapper 404. The first flapper body protrusion 422 and the second flapper body protrusion 434 may maintain the first flapper 402 and the second flapper 404 at a predetermined angle when the check valve assembly 400 is in the open position. In the example of FIGS. 19 and 20, the first flapper 402 and the second flapper 404 may be formed of sheet metal.

As discussed previously, and with reference to FIGS. 19 and 20, the geometry of the first flapper 402 and the second flapper 404 allows for the flappers to be in a fully open position while creating the internal passage, combined flow passage. The nozzle 416 generates low pressure in the flow between the first flapper 402 and the second flapper 404 by accelerating the flow through the nozzle passage of the nozzle 416. The flow outside of the flappers has a higher pressure than the flow inside the passage. The higher pressure acts on the external faces of the first flapper 402 and the second flapper 404 (e.g., the faces or surfaces external to the combined flow passage). This causes a moment on the flappers, maintaining the first flapper 402 and the second flapper 404 together at a predetermined angle (due to the first flapper body protrusion 422 and the second flapper body protrusion 434) without being in touching contact. This eliminates or reduces separated flow vibration.

FIGS. 21 to 23 show schematic views of a check valve assembly 500 coupled to a pipe 90. The check valve assembly 500 includes a first flapper 502, a second flapper 504, a first pin 506, and a second pin 507. The first flapper 502 is pivotally connected to the first pin 506 and the second flapper 504 is pivotally connected to the second pin 507. The first pin 506 and the second pin 507 may extend between opposing points on an inner surface of the pipe 90, as described with respect to other embodiments. The first flapper 502 may be pivotally coupled to the first pin 506 to allow relative rotation of the first flapper 502 with respect to the first pin 406. The second flapper 504 may be pivotally coupled to the second pin 507 to allow relative rotation of the second flapper 504 with respect to the second pin 507. Thus, the first flapper 502 and the second flapper 504 may rotate between an open position (FIG. 20) and a closed position (FIG. 21). One or more protrusions 94 may extend radially inward from an inner surface of the pipe 90. The one or more protrusions 94 may operate to limit upward axial movement of the flappers of the check valve assembly 500.

The check valve assembly 500 includes a nozzle 516 formed by the first flapper 502 and the second flapper 504 in the open position, as shown in FIG. 22. The first flapper 502 has a first flapper body 520. The first flapper body 520 includes a first flapper body protrusion 522 and a first flapper body extension 560. The second flapper 504 has a second flapper body 532. The second flapper body 532 includes a second flapper body protrusion 534 and a second flapper body extension 562. When in the open position of FIG. 22, the first flapper body protrusion 522 and the second flapper body protrusion 534 are located adjacent to one another. The first flapper body protrusion 522 and the second flapper body protrusion 534 may provide proper spacing of the first flapper 502 and the second flapper 504. The first flapper body extension 560 and the second flapper body extension 562 may be spaced such that a nozzle is formed and a low pressure flow is capable of being formed between the first flapper body extension 560 and the second flapper body extension 562. Although not shown in FIG. 22, a fluid may flow through the pipe 90 and the check valve assembly 500 in a manner the same as, or similar to, the flows described previously.

In some examples, the first flapper body protrusion 522, the second flapper body protrusion 534, the first flapper body extension 560, and the second flapper body extension 562 are formed unitarily with a surface of the first flapper 502 and the second flapper 504, respectively. In some examples, the first flapper body protrusion 522, the second flapper body protrusion 534, the first flapper body extension 560, and the second flapper body extension 562 are formed separately of the first flapper 502 and the second flapper 504, respectively, and coupled thereto. The first flapper body protrusion 522, the second flapper body protrusion 534, the first flapper body extension 560, and the second flapper body extension 562 may be bumps or pins extending from the surface of the first flapper 502 and the second flapper 504. The first flapper body protrusion 522 and the second flapper body protrusion 534 may maintain the first flapper 502 and the second flapper 504 at a predetermined angle when the check valve assembly 500 is in the open position. In the example of FIGS. 21 to 23, the first flapper 502 and the second flapper 504 may be formed of sheet metal.

As discussed previously, and with reference to FIGS. 21 to 23, the geometry of the first flapper 502 and the second flapper 504 allows for the flappers to be in a fully open position while creating the internal passage, also referred to as combined flow passage 550. The nozzle created by the first flapper body extension 560 and the second flapper body extension 562 generates low pressure in the flow between the first flapper 502 and the second flapper 504 by accelerating the flow through the nozzle passage (e.g., the passage through the extensions) of the nozzle. The flow outside of the flappers has a higher pressure than the flow inside the passage. The higher pressure acts on the external faces of the first flapper 502 and the second flapper 504 (e.g., the faces or surfaces external to the combined flow passage). This causes a moment on the flappers, maintaining the first flapper 502 and the second flapper 504 together at a predetermined angle (due to the first flapper body protrusion 522 and the second flapper body protrusion 534) without being in touching contact. This eliminates or reduces separated flow vibration.

The technical effect of the check valve assembly of the present disclosure may reduce wear on the check valve assembly, in particular, may reduce wear on the pivotal connection between the flappers and the pin. That is, the flappers of the check valve assembly pivot about the pin to move the check valve assembly between an open position and a closed position. The pivoting about the pin may cause wear on the pin and result in failures of the pin, the check valve assembly, or both the pin and the check valve assembly. A method of the present disclosure may reduce the wear on a check valve assembly. Accordingly, the method may cause a flow through the check valve assembly to move the flappers of the check valve assembly to an open position. Then, the flow may enter the check valve assembly and cause an internal flow through an interior passage of the flappers and an outer flow outside the interior passage and outside the flappers. The flow through the internal passage generates a lower pressure in the internal flow than the outer flow. The lower pressure generates a bending moment about an upper end of the flappers. The bending moment maintains the flappers in the fully open position such that the flapper bodies are in touching contact (as in FIGS. 1 to 16) or such that the flapper bodies are at a predetermined angle, but not in touching contact (as in FIGS. 17 to 23). The internal flow is moved through a nozzle located in the interior passage and the nozzle generates the lower pressure. The interior passage is formed by the flappers, as described previously herein. The interior passages may be formed by the recesses on the flappers.

The one or more protrusions extending radially inward from the pipe to hold limit movement of the flappers in the closed position may take any of the forms described herein. That is, for example, the one or more protrusions 54 may be used in any of the remaining check valve assemblies described herein, likewise, with the one or more protrusions 64, 74, 84, and 94. Similarly, any of the features of the check valve assemblies described herein may be employed with any of the other check valve assemblies.

The check valve assemblies of the present disclosure may be manufactured by additive methods (e.g., 3D printing) or by conventional manufacturing (e.g., molding, machining, casting, etc.). In some examples, the check valve assemblies of the present disclosure may be a standalone part installed in a conventional manner into the pipe. In some examples, the check valve assemblies may be integrated with surround hardware (e.g., the pipe, the frame, or both the pipe and the frame). In some examples, the check valve assembly of the present disclosures have flappers that may share a hinge pin or may have independent hinge pins.

The check valve assemblies of the present disclosure may be employed in engines. Exemplary engines may include, but are not limited to, aircraft engines, commercial engines, marine engines, industrial engines, power generation engines, turboprop engines, turbojet engines, and other gas turbine engines. The check valve assemblies of the present disclosure may apply to engines when the check valve is located in ducts or pipes from the high pressure compressor to the high pressure turbine.

The check valve assemblies of the present disclosure minimize wear failures due to oscillation of the flappers, reduce risk of high temperature gas leakage, improve air flow due to less obstructions in the flow path, and increase part reliability since wear failure is minimized.

The check valve assemblies of the present disclosure provide a nozzle, whether fixed or dynamically formed by the geometry of the flappers as they open, in the center of a two flapper check valve. The flapper geometry is such that when the flapper is fully open, the two flappers are in full contact, parallel to the flow, and create an internal passage into which the nozzle discharges. The nozzle acts as a low pressure generator by means of high speed and the flapper geometry allows the flappers to fully open to be parallel to the flow while creating the mentioned internal passage.

The check valve assemblies of the present disclosure provide a flapper geometry that allows the two flappers to fully open. The geometry of the two flappers creates an internal passage when fully open, in which a fixed nozzle is located at the entrance, and, which generates low pressure, between the two flappers, by accelerating the flow therethrough. The higher pressure on the external faces maintains the two flappers fully open, with positive force margin to avoid instabilities.

Further aspects of the present disclosure are provided by the subject matter of the following clauses.

According to an aspect of the present disclosure, a check valve assembly includes a first flapper, a second flapper, an internal passage formed by the first flapper and the second flapper, and a nozzle disposed within the internal passage and configured to generate an internal flow in the internal passage, and, in response to a fluid flow through the check valve assembly, the first flapper and the second flapper are configured to move between an open position allowing the internal flow through the internal passage and an outer flow outside the internal passage, and a closed position preventing flow through the internal passage, and, when the first flapper and the second flapper are operably in the open position, the internal flow has a lower pressure than the outer flow outside of the internal passage, such that the first flapper and the second flapper are maintained in the open position.

The check valve assembly of the preceding clause, wherein the first flapper has a first flapper flow passage and the second flapper has a second flapper flow passage, and wherein the first flapper flow passage is formed by a recess on the first flapper and the second flapper flow passage is formed by a recess on the second flapper.

The check valve assembly of any preceding clause, further including a recess between an outer surface of the nozzle and both an inner surface of the first flapper and an inner surface of the second flapper, wherein the internal flow includes a flow through the recess and a flow through the nozzle.

The check valve assembly of any preceding clause, further including protrusions extending radially inward from a check valve assembly housing, the protrusions configured to maintain the check valve assembly in the closed position.

The check valve assembly of any preceding clause, further including a pin, the first flapper and the second flapper being pivotally connected to the pin.

The check valve assembly of any preceding clause, wherein a moment on each of the first flapper and the second flapper maintains the first flapper in touching contact with the second flapper.

The check valve assembly of any preceding clause, further including a first pin and a second pin, the first flapper pivotally connected to the first pin and the second flapper pivotally connected to the second pin.

The check valve assembly of any preceding clause, the first flapper including a first flapper body protrusion and the second flapper including a second flapper body protrusion, wherein the first flapper body protrusion and the second flapper body protrusion are configured to maintain the first flapper and the second flapper at a predetermined angle in the open position or wherein the nozzle is formed by the first flapper body protrusion and the second flapper body protrusion.

The check valve assembly of any preceding clause, wherein the first flapper includes a first flapper body extension and the second flapper includes a second flapper body extension, and the nozzle being formed by the first flapper body extension and the second flapper body extension.

A method of operating a check valve assembly, the method includes in response to receiving a fluid flow through the check valve assembly, moving a first flapper and a second flapper of the check valve assembly to an open position, wherein an internal flow is caused to flow through an interior passage between the first flapper and the second flapper and an outer flow is caused to flow outside the interior passage and outside the first flapper and the second flapper, wherein the internal flow generates a lower pressure than the outer flow, and wherein the lower pressure generates a bending moment about an upper end of the first flapper and an upper end of the second flapper, the bending moment maintaining the first flapper and the second flapper at a predetermined angle or in touching contact with each other.

The method of the preceding clause, wherein the internal flow is caused to flow through a nozzle located in the interior passage to generate the lower pressure.

The method of any preceding clause, wherein the interior passage is formed by recesses on each of the first flapper and the second flapper.

The method of any preceding clause, wherein the first flapper and the second flapper are each caused to pivot about a pin between the open position and a closed position.

The method of any preceding clause, wherein the first flapper is caused to pivot about a first pin and the second flapper is caused to pivot about a second pin.

The method of any preceding clause, wherein the bending moment on each of the first flapper and the second flapper maintains the first flapper in touching contact with the second flapper The method of any preceding clause, wherein the internal flow is caused to flow through a recess between an outer surface of a nozzle and both an inner surface of the first flapper and an inner surface of the second flapper and through the nozzle The method of any preceding clause, wherein the first flapper includes a first flapper body protrusion and the second flapper includes a second flapper body protrusion, wherein the first flapper body protrusion and the second flapper body protrusion are caused to maintain the first flapper and the second flapper at the predetermined angle, and wherein the first flapper body protrusion and the second flapper body protrusion generate the lower pressure.

The method of any preceding clause, wherein the first flapper includes a first flapper body extension and the second flapper includes a second flapper body extension, and wherein the first flapper body extension and the second flapper body extension generate the lower pressure.

The method of any preceding clause, further including: in response to ceasing a fluid flow through the check valve assembly, moving the first flapper and the second flapper of the check valve assembly to a closed position.

The method of any preceding clause, wherein one or more protrusions extending radially inward from a check valve assembly housing maintain the first flapper and the second flapper in the closed position.

Although the foregoing description is directed to the preferred embodiments, it is noted that other variations and modifications will be apparent to those skilled in the art, and may be made without departing from the spirit or scope of the disclosure. Moreover, features described in connection with one embodiment may be used in conjunction with other embodiments, even if not explicitly stated above.

The invention claimed is:

1. A check valve assembly comprising:
   a first flapper;
   a second flapper;
   an internal passage formed by the first flapper and the second flapper;

a nozzle disposed within the internal passage and configured to generate an internal flow in the internal passage; and a recess between an outer surface of the nozzle and both an inner surface of the first flapper and an inner surface of the second flapper, wherein the internal flow comprises a flow through the recess and a flow through the nozzle wherein, in response to a fluid flow through the check valve assembly, the first flapper and the second flapper are configured to move between an open position allowing the internal flow through the internal passage and an outer flow outside the internal passage, and a closed position preventing flow through the internal passage, and wherein, when the first flapper and the second flapper are operably in the open position, the internal flow has a lower pressure than the outer flow outside of the internal passage, such that the first flapper and the second flapper are maintained in the open position.

2. The check valve assembly of claim 1, wherein the first flapper has a first flapper flow passage and the second flapper has a second flapper flow passage, and wherein the first flapper flow passage is formed by the recess between the first flapper and the nozzle and the second flapper flow passage is formed by the recess between the second flapper and the nozzle.

3. The check valve assembly of claim 1, further comprising protrusions extending radially inward from a check valve assembly housing, the protrusions configured to maintain the check valve assembly in the closed position.

4. The check valve assembly of claim 1, further comprising a pin, the first flapper and the second flapper being pivotally connected to the pin.

5. The check valve assembly of claim 1, wherein a moment on each of the first flapper and the second flapper maintains the first flapper in touching contact with the second flapper.

6. The check valve assembly of claim 1, further comprising a first pin and a second pin, the first flapper pivotally connected to the first pin and the second flapper pivotally connected to the second pin.

7. A method of operating a check valve assembly, the method comprising:
in response to receiving a fluid flow through the check valve assembly, moving a first flapper and a second flapper of the check valve assembly to an open position,
wherein an internal flow is caused to flow through an interior passage between the first flapper and the second flapper and an outer flow is caused to flow outside the interior passage and outside the first flapper and the second flapper,
wherein the internal flow generates a lower pressure than the outer flow,
wherein the lower pressure generates a bending moment about an upper end of the first flapper and an upper end of the second flapper, the bending moment maintaining the first flapper and the second flapper at a predetermined angle or in touching contact with each other, and
wherein the internal flow is caused to flow through a recess between an outer surface of a nozzle and both an inner surface of the first flapper and an inner surface of the second flapper and through the nozzle.

8. The method of claim 7, wherein the internal flow is caused to flow through a nozzle located in the interior passage to generate the lower pressure.

9. The method of claim 7, wherein the interior passage is formed by recesses on each of the first flapper and the second flapper.

10. The method of claim 7, wherein the first flapper and the second flapper are each caused to pivot about a pin between the open position and a closed position.

11. The method of claim 7, wherein the first flapper is caused to pivot about a first pin and the second flapper is caused to pivot about a second pin.

12. The method of claim 7, wherein the bending moment on each of the first flapper and the second flapper maintains the first flapper in touching contact with the second flapper.

13. The method of claim 7, further comprising: in response to ceasing a fluid flow through the check valve assembly, moving the first flapper and the second flapper of the check valve assembly to a closed position.

14. The method of claim 13, wherein one or more protrusions extending radially inward from a check valve assembly housing maintain the first flapper and the second flapper in the closed position.

15. A check valve assembly comprising:
a first flapper including a first flapper body protrusion;
a second flapper including a second flapper body protrusion;
an internal passage formed by the first flapper and the second flapper; and
a nozzle disposed within the internal passage and configured to generate an internal flow in the internal passage,
wherein, in response to a fluid flow through the check valve assembly, the first flapper and the second flapper are configured to move between an open position allowing the internal flow through the internal passage and an outer flow outside the internal passage, and a closed position preventing flow through the internal passage,
wherein, when the first flapper and the second flapper are operably in the open position, the internal flow has a lower pressure than the outer flow outside of the internal passage, such that the first flapper and the second flapper are maintained in the open position, and
wherein (i) the first flapper body protrusion and the second flapper body protrusion are configured to maintain the first flapper and the second flapper at a predetermined angle in the open position or (ii) wherein the nozzle is formed by the first flapper body protrusion and the second flapper body protrusion.

16. The check valve assembly of claim 15, wherein the first flapper includes a first flapper body extension and the second flapper includes a second flapper body extension, and the nozzle being formed by the first flapper body extension and the second flapper body extension.

17. The check valve assembly of claim 15, further comprising protrusions extending radially inward from a check valve assembly housing, the protrusions configured to maintain the check valve assembly in the closed position.

18. A method of operating a check valve assembly, the method comprising:
in response to receiving a fluid flow through the check valve assembly, moving a first flapper and a second flapper of the check valve assembly to an open position;
wherein an internal flow is caused to flow through an interior passage between the first flapper and the second flapper and an outer flow is caused to flow outside the interior passage and outside the first flapper and the second flapper, wherein the internal flow generates a lower pressure than the outer flow, wherein the lower pressure generates a bending moment about an upper end of the first flapper and an upper end of the second flapper, the bending moment maintaining the first flapper and the second flapper at a predetermined angle or in touching contact with each other, and wherein the first flapper includes a first flapper body protrusion and the second flapper includes a second flapper body protrusion, wherein the first flapper body protrusion and the second flapper body protrusion are caused to maintain the first flapper and the second flapper at the predetermined angle, and wherein the first flapper body protrusion and the second flapper body protrusion generate the lower pressure.

19. The method of claim 18, wherein the first flapper includes a first flapper body extension and the second flapper includes a second flapper body extension, and wherein the first flapper body extension and the second flapper body extension generate the lower pressure.

20. The method of claim 18, further comprising: in response to ceasing a fluid flow through the check valve assembly, moving the first flapper and the second flapper of the check valve assembly to a closed position.

* * * * *